US009134468B2

(12) United States Patent
Noizet et al.

(10) Patent No.: US 9,134,468 B2
(45) Date of Patent: Sep. 15, 2015

(54) OPTICAL AUTHENTICATION COMPONENT AND METHOD OF FABRICATING SAID COMPONENT

(75) Inventors: Alexandre Noizet, Bussy-Saint-Georges (FR); Valery Petiton, Vendrest (FR)

(73) Assignee: Hologram.Industries, Bussy Saint Georges (FR)

( * ) Notice: Subject to any disclaimer, the term of this patent is extended or adjusted under 35 U.S.C. 154(b) by 239 days.

(21) Appl. No.: 13/695,638

(22) PCT Filed: May 5, 2011

(86) PCT No.: PCT/EP2011/057204
§ 371 (c)(1),
(2), (4) Date: Nov. 1, 2012

(87) PCT Pub. No.: WO2011/138394
PCT Pub. Date: Nov. 10, 2011

(65) Prior Publication Data
US 2013/0052373 A1  Feb. 28, 2013

(30) Foreign Application Priority Data
May 7, 2010 (FR) ..................................... 10 53582

(51) Int. Cl.
*G02B 5/18* (2006.01)
*B42D 25/29* (2014.01)
(Continued)

(52) U.S. Cl.
CPC .............. *G02B 5/1861* (2013.01); *B42D 25/00* (2014.10); *B42D 25/29* (2014.10); *B42D 25/324* (2014.10);
(Continued)

(58) Field of Classification Search
CPC .. B42D 15/0013; B42D 15/10; B42D 15/105; G03H 1/0011; G03H 1/0244; G03H 1/0256; G02B 5/1814; G02B 5/1861
USPC .................................. 428/195.1, 201, 203, 29
See application file for complete search history.

(56) References Cited

U.S. PATENT DOCUMENTS 6,043,936 A * 3/2000 Large ............................ 359/572
6,066,378 A * 5/2000 Morii et al. ................... 428/40.2
(Continued)

FOREIGN PATENT DOCUMENTS

AU   2005 200 844 A1   3/2005
CH       691750 A5     9/2001
(Continued)

OTHER PUBLICATIONS

Office Action issued in corresponding European Application No. 11722750.4, mailed Aug. 15, 2013 (9 pages).
(Continued)

*Primary Examiner* — Gerard Higgins
(74) *Attorney, Agent, or Firm* — Osha Liang LLP (57) ABSTRACT

An optical authentication component visible in reflection having a structure imprinted on a substrate of index $n_0$, a thin layer, made of a dielectric material having a refractive index $n_1$, deposited on the structure, and a layer made of a material having an index $n_2$ similar to $n_0$, encapsulating the structure coated with the thin layer, is disclosed. The structure has a first pattern modulated by a second pattern, the first pattern is a bas-relief with an array of facets, having shapes which are defined to simulate an image in relief of an object in relief, and the second pattern is a periodic grating that modulates the first pattern which produces, after the thin layer has been deposited and the structure has been encapsulated, a first color at a first viewing angle and a different second color at a second viewing angle, obtained by azimuthal rotation of the component.

12 Claims, 7 Drawing Sheets

(51) Int. Cl.
*B42D 25/00* (2014.01)
*B42D 25/324* (2014.01)
*B42D 25/328* (2014.01)

(52) U.S. Cl.
CPC ............ *B42D 25/328* (2014.10); *G02B 5/1809* (2013.01); *G02B 5/1828* (2013.01); *B42D 2035/20* (2013.01)

(56) References Cited

U.S. PATENT DOCUMENTS

| 2006/0251863 | A1 | 11/2006 | Katschorek et al. |
| 2007/0053028 | A1 | 3/2007 | Ezra |
| 2009/0122412 | A1 | 5/2009 | Steenblik et al. |

FOREIGN PATENT DOCUMENTS

| CN | 1646328 | A | 7/2005 |
| EP | 2 077 459 | A1 | 7/2009 |
| EP | 2161598 | A2 | 3/2010 |
| FR | 2509873 | A1 | 1/1983 |
| JP | S61-254975 | A | 11/1986 |
| JP | S62-042179 | A | 2/1987 |
| JP | 2005-528634 | A | 9/2005 |
| JP | 2008-070867 | A | 3/2008 |
| JP | 2009-535670 | A | 10/2009 |
| WO | 97/21121 | A1 | 6/1997 |

OTHER PUBLICATIONS

Office Action in counterpart Chinese Patent Application No. 201180023105.3 issued on Jun. 5, 2014 (16 pages).

International Search Report issued in PCT/EP2011/057204 mailed Jul. 1, 2011 (6 pages).

Written Opinion issued in PCT/EP2011/057204 mailed Jul. 1, 2011 (6 pages).

Notification of Reasons for Refusal issued in corresponding Japanese Application No. 2013-508503, mailed Sep. 30, 2014 (11 pages).

\* cited by examiner

OPTICAL AUTHENTICATION COMPONENT AND METHOD OF FABRICATING SAID COMPONENT

FIELD OF THE INVENTION

The present invention relates to the field of security markings. More particularly, it relates to an optical component for verifying the authenticity of a product or a document and to a method for manufacturing such a component.

PRIOR ART

The human eye is mainly sensitive to three parameters: color, contrast and depth. There are many types of security marking components and these components exhibit a variety of optical behaviors.

Figure 1:
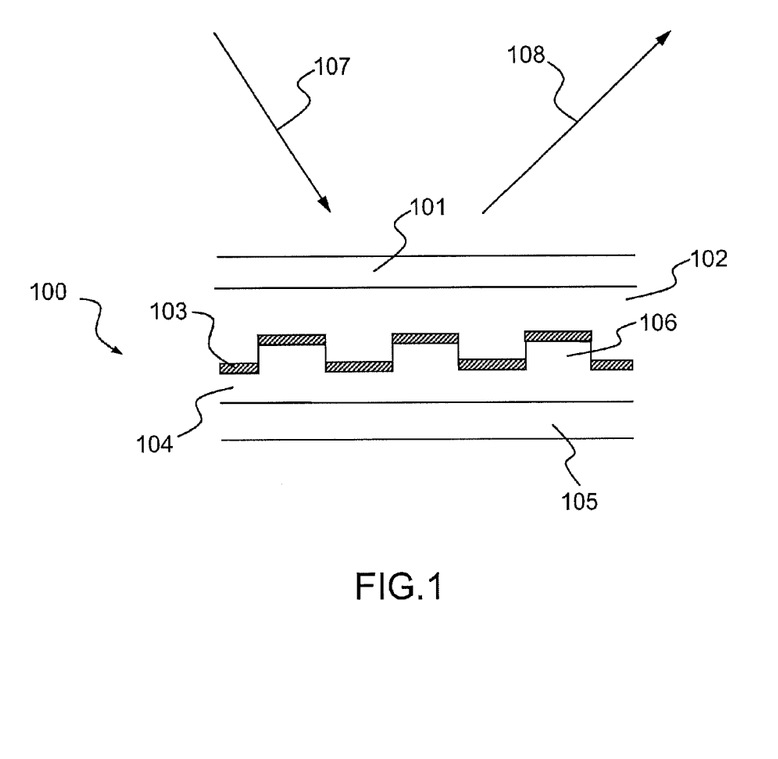
FIG. 1, described above, shows a cross-sectional view of an optical component according to the prior art.

Among components with noteworthy optical behavior, one known security component comprises a color diffractive subtractive filter such as described in French patent FR 2 509 873. FIG. 1 shows a cross-sectional view of a color diffractive subtractive filter 100 according to the prior art. The filter 100 comprises a polyester film 101 coated with a layer of imprintable lacquer 102 embossed by stamping in a known way in order to produce diffracting structures intended to authenticate documents. The stamped area forms a periodic grating the depth and period of which are respectively about one hundred to a few hundred nanometers in size. The stamped area is covered by vacuum deposition of a layer 103 of a transparent, high-refractive-index, dielectric material and then coated with a layer 104 having a low refractive index that is similar to the refractive index of the imprintable lacquer. Thus, there is a large difference between the index of the thin deposited layer 103 and the indices of the materials of the substrate 102 and encapsulation 104. The assembly thus produced may then be covered with an adhesive film 105, for example deposited using a coating technique or by lamination, in order to make it easier to attach the assembly to the document to be protected.

Such a component behaves as a structured waveguide, allowing resonances to be excited in guided modes at different wavelengths as a function of polarization. In reflection, such a component thus behaves as a colored mirror the color of which varies depending on the viewing angle. The color properties of the component 100 at each viewing angle 108 especially depend on the direction of the incident light 107 and on the physical parameters of the component, such as the period of the diffracting elements 106, the thickness of the thin layer 103 and the refractive indices of the materials making up the filter. Such a component produces a variable color effect, depending on the illumination and viewing angles. The component thus exhibits a first color at a certain viewing angle and a second color at a second viewing angle perpendicular to the first angle and obtained by an azimuthal rotation of the component for given angles of incidence and reflection. Such a security component has the advantage of functioning well under diffuse lighting conditions and is generally considered to be very resistant to counterfeiting.

However, the human eye is also sensitive to depth, and such a component only allows two-dimensional images to be seen.

The present invention relates to an optical component that in particular has all the advantages of a subtractive color filter, especially a color that varies as a function of viewing angle, and in addition provides a three-dimensional optical depth effect. This especially makes it possible to add a second optically perceivable selection criterion and allows an observer to more easily recognize and memorize an image.

SUMMARY OF THE INVENTION

According to a first aspect, the invention relates to an optical authentication component visible in reflection, comprising:
  at least one structure imprinted on a substrate of index $n_0$;
  a thin layer, made of a dielectric material having a refractive index $n_1$ different to $n_0$, deposited on said structure; and
  a layer, made of a material having an index $n_2$ similar to $n_0$, encapsulating the structure coated with the thin layer,
said structure comprising a first pattern modulated by a second pattern:
  the first pattern being a bas-relief comprising an array of facets the shapes of which are defined in order to simulate an image in relief of an object in relief;
  the second pattern being a periodic grating defined in order to modulate the first pattern in order to produce, after the thin layer has been deposited and said structure has been encapsulated, a first color at a first viewing angle and a different second color at a second viewing angle obtained by azimuthal rotation of the component.

According to one embodiment, the first pattern is calculated to form a recognizable graphic when the component is observed in order to check authenticity.

According to another embodiment, an index difference $\Delta n$ between the indices $n_1$ and $n_0$ is greater than about 0.5.

According to another embodiment, the material of index $n_1$ comprises at least one material from the group consisting of: zinc sulfide and titanium dioxide.

According to another embodiment, a depth of the first pattern is between 0.5 and 7 microns and a depth of the second pattern is between 50 and 300 nanometers.

According to another embodiment, the second pattern has a pitch of between 200 and 500 nanometers.

According to another embodiment, the minimum separation between more than 90% of the pairs of adjacent ridges of the first pattern is at least two times larger than the pitch of the second pattern.

According to another embodiment, the second pattern is a one-dimensional periodic grating.

According to another embodiment, the second pattern is a two-dimensional periodic grating.

According to another embodiment, the substrate and the material forming the thin layer are transparent.

According to another embodiment, the component furthermore comprises:
  a polymer layer deposited on the substrate;
  an opaque layer deposited on the encapsulating layer (50); and
  an adhesive layer deposited on the opaque layer, for adhesive bonding to the surface of a document.

According to another embodiment, a section of the first pattern has a shape comprising multiple levels.

According to a second aspect, the invention relates to a method for manufacturing an optical authentication component comprising forming at least one structure imprinted on a substrate of index $n_0$, said structure comprising a first pattern modulated by a second pattern,
  the first pattern being a bas-relief comprising an array of facets the shapes of which are defined in order to simulate an image in relief of an object in relief;
  the second pattern being a periodic grating defined in order to modulate the first pattern in order to produce, after a thin layer has been deposited and said structure has been encapsulated, a first color at a first viewing angle and a different second color at a second viewing angle obtained by azimuthal rotation of the component, the method furthermore comprising:

a step of depositing the thin layer of a dielectric material having a first refractive index $n_1$ on said structure; and an encapsulation step consisting in coating the structure covered with said thin layer with a layer of a material having a second index $n_2$ similar to $n_0$.

According to one embodiment, the first pattern is calculated using an image of said object to encode the relief onto several gray levels.

According to another embodiment, forming the structure imprinted on the substrate includes producing an optical master, comprising:

a first exposure of a photoresist, such as to form, after development, the first pattern in said resist;

a second exposure of the resist, such as to form, after development, the second pattern in said resist; and development of the resist using a given chemical solution.

BRIEF DESCRIPTION OF THE FIGURES

Other features and advantages of the invention will become apparent on reading the following description, illustrated by the figures, in which.

DETAILED DESCRIPTION

Figure 2:
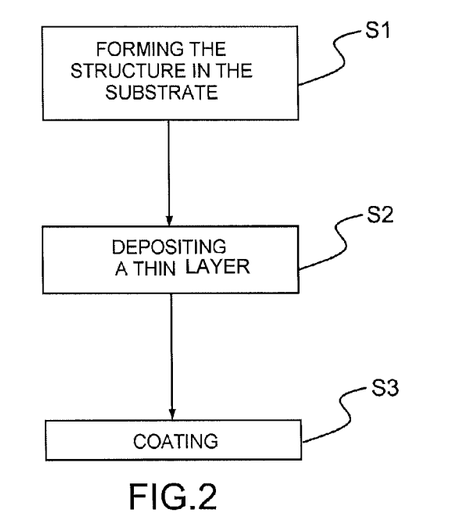
FIG. 2 illustrates schematically the steps of a method for manufacturing an optical authentication component according to the invention.

FIG. 2 illustrates schematically the steps of a method for manufacturing an optical authentication component according to one embodiment of the present invention.

The method, such as described in FIG. 2, generally comprises a first step S1 of forming a structure imprinted on a substrate made of a material having an index $n_0$. The substrate is for example a transparent thermoformable lacquer and the imprinted structure may be formed in the substrate by embossing. The material of the substrate typically has a refractive index $n_0$ of about 1.5. As will be described in more detail below, the imprinted structure comprises a first pattern modulated by a second pattern. The first pattern of the imprinted structure forms a bas-relief defined in order to simulate an image in relief. The second pattern of the imprinted structure forms a periodic grating defined to produce, after a thin layer of a material of refractive index having an index difference $\Delta n$ with the index $n_0$, has been deposited and encapsulated in a material having an index $n_2$ similar to $n_0$, a first color in reflection at a first angle and a second color in reflection at a second angle obtained by azimuthal rotation of the component. Thus, for given angles of incidence and reflection, the component changes color when it is rotated about an axis perpendicular to a plane of extension of the component. The modulation of the first pattern by the second pattern may be a superposition of the first and second patterns. The second pattern may be a one-dimensional or two-dimensional periodic grating having a rectangular or sinusoidal cross section. Typically, the pitch and the depth of the periodic grating forming the second pattern lie between 250 and 400 nanometers and between 50 and 300 nanometers, respectively. It is then possible to observe, in the case of a one-dimensional grating, a color change for an azimuthal rotation angle of substantially 90 degrees. In the case of a two-dimensional grating, the depth may also be between 50 and 300 nanometers, the pitch typically being between 250 and 400 nanometers. The dimensions of the grating may, for example, be identical in both dimensions. In this way, a symmetric component is obtained and the color observed is stable when the component is subjected to an azimuthal rotation of substantially 90 degrees. In contrast, for this example, the Applicant has demonstrated that a color change may be obtained with an azimuthal rotation of substantially 45 degrees.

Next the method comprises a step S2 of depositing the thin layer of material of refractive index $n_1$, having an index difference $\Delta n$ with the index of the material forming the substrate. Typically, the index difference is chosen to be greater than 0.5. For example, the substrate has an index of about 1.5 and the thin layer is made of a high-index material, for example of zinc sulfide (ZnS) having a index of about 2.2, or of titanium dioxide ($TiO_2$) having an index of about 2.5. Typically, the thin layer is between 50 and 150 nm in thickness.

The pitch of the grating and its depth, and the thickness of the thin layer are chosen, in a known way, depending on the colors in reflection desired for the component. Thus, for example, for smaller grating pitches (smaller than 300 nm), colors tending towards a blue/green color are obtained, whereas with larger pitches, colors tending towards a green/red color are obtained.

Next the method comprises an encapsulation step S3 consisting for example in coating the structure covered with said thin layer with a material having an index $n_2$ similar to $n_0$. In another embodiment, the component may be produced using a substrate and encapsulating layer having similar indices that are higher than the index of the thin intermediate layer of material ($\Delta n < 0$).

Figure 3:
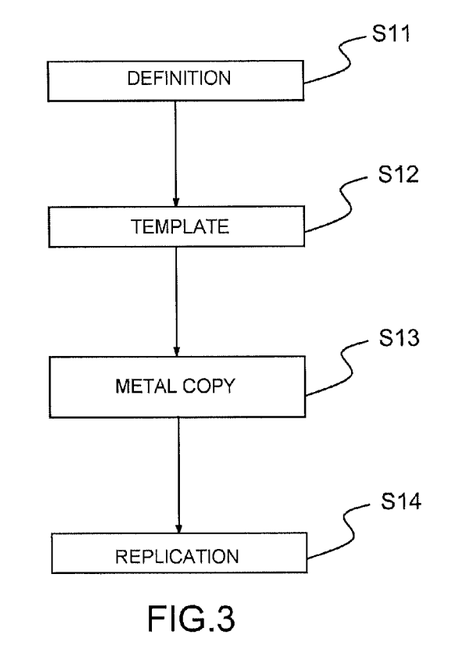
FIG. 3 illustrates in greater detail the steps used to form an imprinted structure according to one embodiment.

FIG. 3 shows schematically the steps used to form the structure imprinted on the substrate according to one embodiment of the invention.

The method generally comprises a first step S11 of defining the shape of the structure intended to be imprinted on a final substrate. In the following description, the expression "final substrate" is understood to refer to the part of the optical component in which the imprinted structure is formed. The final substrate for example comprises the material of index $n_0$.

As explained above, the structure formed in the final substrate comprises a first pattern modulated by a second pattern. The first pattern of the structure may be defined in order to simulate the properties in reflection of a surface of an object. For example, the first pattern forms a bas-relief that results from translating regions of the surface of the object, it being desired to simulate the properties of these regions in reflection. In order to define the shape of the first pattern the method used to form Fresnel lenses may be employed. More details on the step of defining the first pattern are given in the description with regard to FIGS. 4A-B, 5A-B and 6A-B. The first pattern may for example be defined so as to reproduce a recognizable graphic in relief or a texture having a recognizable relief. The first pattern may be defined using the object the depth effect of which is intended to be reproduced or using a representation of the object that incorporates depth data. For example, the first pattern may be defined using an image of the object in relief, encoding depth data in gray levels. The second pattern of said structure takes the form of a one-dimensional or two-dimensional periodic grating, such as described above.

The method, such as described in FIG. 3, then comprises a second step called a template step S12, which consists in creating an original template, also called an optical master. The optical master is for example an optical substrate in which said structure is formed.

The optical master may be formed by e-beam or optical lithography methods known to those skilled in the art.

For example, according to a first embodiment, the optical master is obtained by etching an electron-sensitive resist using a beam of electrons. The relief may thus be obtained in the electron-sensitive resist by directly varying the electron-beam flux incident on the zone that it is desired to etch. In this embodiment, the structure comprising the first pattern modulated by the second pattern may be etched in a single step, using a series method.

According to another embodiment, an optical lithography (or photolithography) technique may be used. The optical master is in this example a sheet of photoresist and the template step is carried out by exposing the sheet one or more times using projection masks, either phase masks and/or amplitude masks, followed by development in an appropriate chemical solution. For example, a first exposure is carried out through an amplitude mask the coefficients of transmission of which are chosen so that, after development, a relief corresponding to the first pattern is formed. Next, a second blanket exposure is carried out using a second mask of the phase mask type. According to methods known to those skilled in the art, the phase variations of this mask may be calculated beforehand in order to form, after development, a relief corresponding to the second pattern. The order in which the patterns are formed is unimportant and may be changed. The development step is then carried out. Thus, an optical master, comprising a structure resulting from superposition of the first pattern and the second pattern, is obtained after development.

The optical master resulting from the superposition of the first and second patterns comprises, after development, a nanorelief, which is able to produce the colored mirror effect the color of which varies depending on the viewing angle, superposed on a microrelief that reproduces the optical depth effect of the defined object. In one embodiment, the depth effect corresponds to a texture possibly having a random or repetitive character.

The method, such as described in FIG. 3, then comprises a step S13 of making a metal copy of the optical master, for example by electroplating. The step of making a metal copy allows the shape of the optical master to be copied to a stronger metal substrate, so as to obtain a "metal master" in which said structure is formed. Thus, the optical master may be covered with a sheet of metal, for example of nickel, which reproduces the structure formed by the optical master.

A step (not shown in the figure) of duplicating the metal master is generally carried out to form an array of metal masters that may be used to obtain a mass manufacturing tool able to replicate the structure in industrial amounts. This duplication step for example consists in reproducing the metal master a plurality of times over a sizeable metal area so as to obtain an array of metal masters.

Next, a step S14 of replicating the metal master, or metal array if appropriate, is carried out to form the structure in the final substrate. In one embodiment, the metal master may for example be fitted to a heated cylinder so as to emboss the structure on the final substrate. In the embodiment where the replication is carried out by embossing, the final substrate may comprise a plastic substrate covered with an embossing lacquer the refractive index $n_0$ of which is about 1.5. In another embodiment, the replication step may be carried out using a curing step using UV (ultraviolet) light, a.k.a UV-curing. In the embodiment where the replication is obtained by UV-curing, the final substrate may comprise a plastic substrate covered with a lacquer that can be cured by UV-flash curing and the refractive index $n_0$ of which is about 1.5. Replication by UV-curing especially allows structures with a large depth amplitude to be reproduced and also increases the fidelity of the replication. Generally, any other high-resolution replication method known from the prior art may be used in the replication step.

FIGS. 4A-B, 5A-B and 6A-B more particularly illustrate how the shape of the first pattern is defined in order to simulate an image in relief according to various embodiments of the present invention.

Figure 4A:
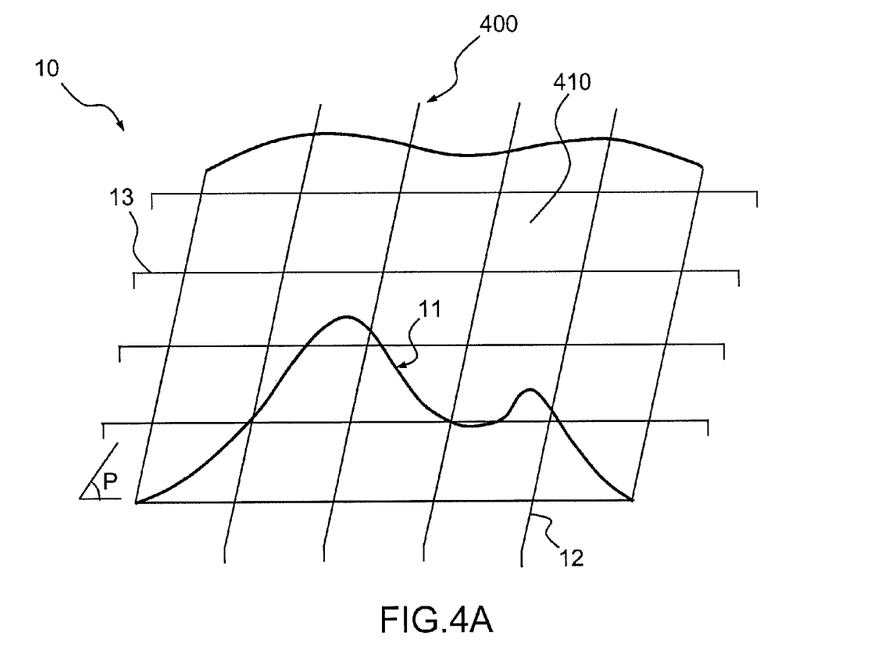
FIGS. 4A and 4B respectively show a perspective view and a cross-sectional view of an object a grid of which is shown, the grid being used to define the shape of a first pattern that simulates, according to one embodiment of the present invention, the image in relief of the object.
Figure 4B:
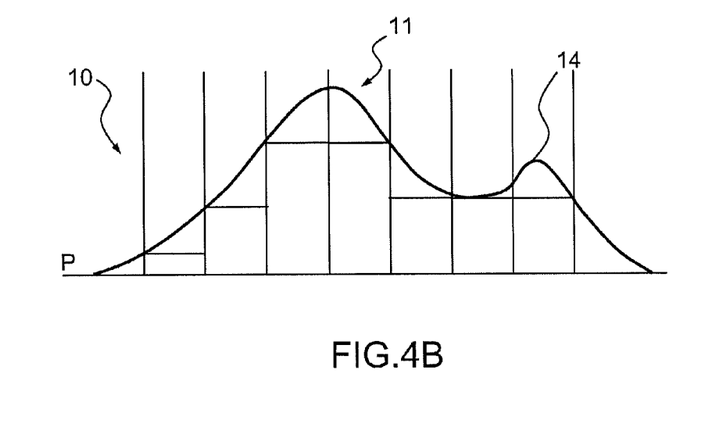

More precisely, FIG. 4A shows a semi-isometric perspective view of an object 10 the depth effect of which it is desired to simulate. FIG. 4B illustrates a cross section through the object 10 for the sake of legibility.

The shape of the first pattern 22 (FIG. 5A and the following figures) may be obtained by defining, in a first step, a grid 400 of the object 10 of constant pitch. A substrate plane P may be defined for the object 10 such as illustrated in FIG. 4A. The grid 400 of the object 10 may be formed by one or more first elementary planes 12 perpendicular to the plane P and parallel to one another, and by one or more second elementary planes 13 perpendicular to the plane P and to the first elementary planes 12. In the representation shown in FIG. 4B, the cross-sectional plane 11 may be one of said second elementary planes. In one embodiment, the grid may take a different form that takes advantage of the symmetry of the object 10 and/or may not be regular. The grid 400 partitions an external surface of the object 10. For each zone 410 (also called a cell) of the grid 400, an elementary area 14, resulting from the griding of the external surface of the object, may be defined. The grid 400 may be chosen such that the elementary areas 14 are comparable to inclined planes. For example, the grid may form square sections with sides that are 10 to 25 microns in length. The shape of the first pattern 22 may be obtained by translating, in each cell, the elementary areas 14, so as to obtain a first pattern in the form of a bas-relief of smaller thickness, the facets 24 of which bas-relief (FIG. 5A and the following figures) reproduce the shape of the elementary areas 14.

Figure 5A:
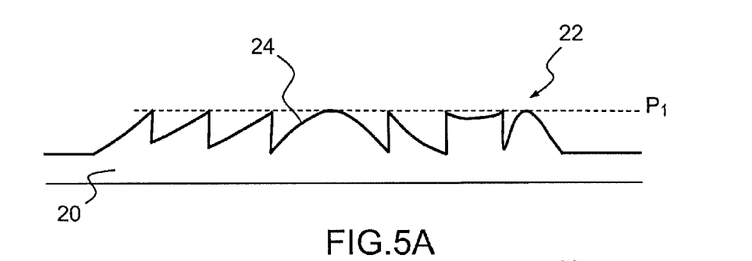
FIGS. 5A and 5B illustrate two exemplary first patterns obtained using the object grid shown in FIGS. 4A and 4B, according to other embodiments of the present invention.

In the embodiment illustrated in FIG. 5A, the translation of each cell is such that the crests of the facets 24 of the first pattern are located in a plane P1 at a preset height above the plane of the substrate 20. Such an embodiment is advantageous in the context of replication by embossing because it limits thickness variations in the first pattern.

Figure 5B:
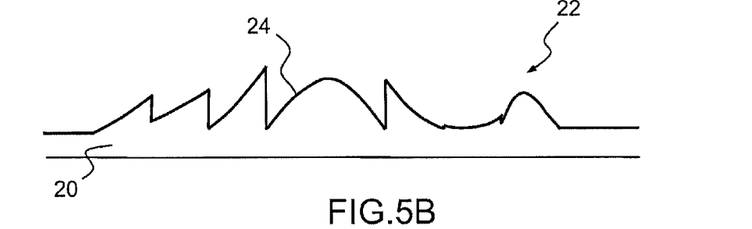

In another embodiment illustrated in FIG. 5B, the translation of each cell is such that the volume of the facets of the resulting first pattern is minimized. Such an embodiment is advantageous in the context of replication of the optical substrate by UV-curing because UV-curing is sensitive to small thickness variations.

Figure 6A:
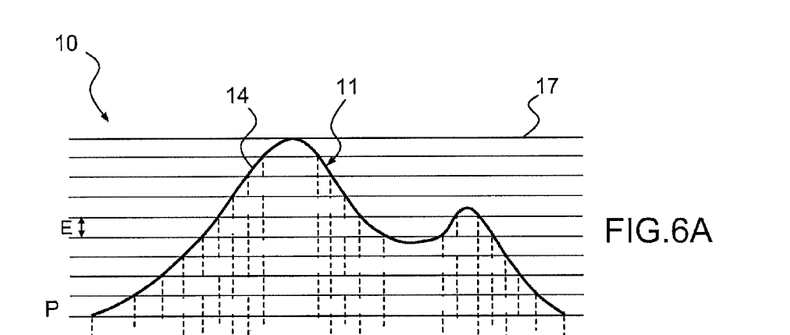
FIGS. 6A and 6B illustrate the definition of the first pattern, according to another embodiment of the invention.
Figure 6B:
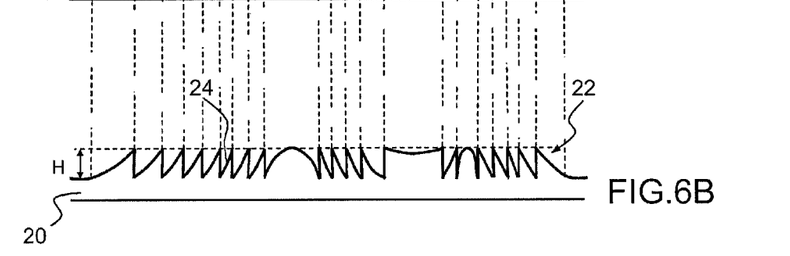

In another embodiment illustrated in FIGS. 6A and 6B, the shape of the first pattern 22 may be defined so as to limit the thickness H of the first pattern 22 to a preset value. The grid then comprises planar cells taking the form of slices. FIGS. 6A and 6B illustrate a cross-sectional view of such a grid of the object 10, which allows the thickness H of the first pattern 22 obtained to be controlled by controlling a constant spacing E between the grid planes 17, which are parallel to one another and to the substrate plane P of the object 10. The thickness of the resulting first pattern 22 may thus be kept constant. As above, the shape of the first pattern 22 may be obtained by translating the elementary areas 14 in order to obtain a first pattern in the form of a bas-relief of smaller thickness, the facets 24 of which reproduce the shape of the elementary areas 14. Such an embodiment is advantageous in the context of a replication by embossing because it limits thickness variations in the resulting first pattern.

Thus, generally, the overall surface of the first pattern 22 obtained is not smooth but consists of a number of facets 24 separated by discontinuities. The crests of the facets 24 of the first pattern form an alternation of ridges, most of which are acute. The facets of the first pattern are generally between 0.5 and 7 microns in height.

The first pattern, the shape of which is defined beforehand, may be formed in the substrate 20 using one of the methods described above. Thus, the sensation of depth obtained by observing the first pattern 22 in the substrate is very close to the sensation of depth obtained by observing the object 10. This especially makes it possible to obtain a depth effect using an almost flat surface. The resulting thickness of the first pattern is typically smaller than a few microns and advantageously smaller than one micron.

Figure 7:
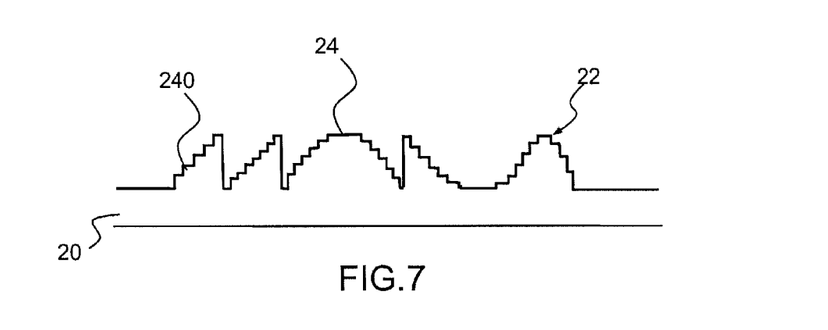
FIG. 7 illustrates the approximate shape of a first pattern according to one embodiment of the present invention.

FIG. 7 illustrates an alternative embodiment in which the shape of the facets of the first pattern 22 in the substrate 20 is approximated by areas 240 comprising two or more levels. The pitch of each level is typically about 500 nanometers to 2 microns. Relative to a continuous profile, the multilevel, or even binary (two-level), areas will degrade, to a greater or lesser extent, the effect obtained, but they are simpler to produce. It is therefore a case of finding a good compromise depending on the desired effect.

Figure 8A:
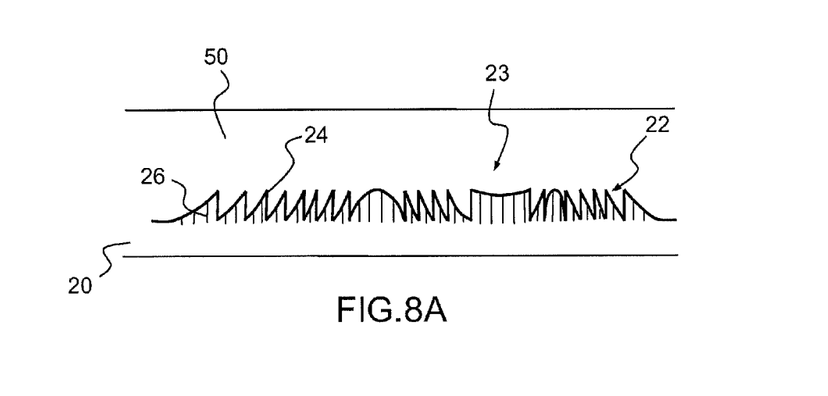
FIGS. 8A and 8B respectively show a cross-sectional view and an enlarged cross-sectional view of an optical authentication component according to one embodiment of the invention.
Figure 8B:
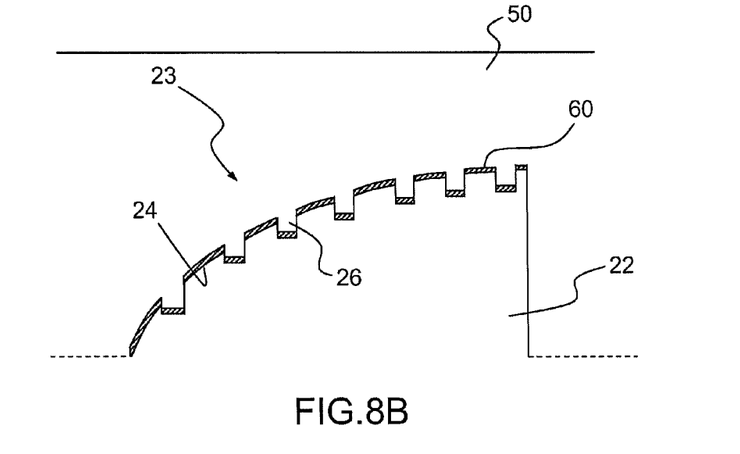

FIGS. 8A and 8B illustrate cross-sectional views of an optical component according to one embodiment of the present invention.

The optical component comprises an imprinted structure that may result from replication, by embossing on a substrate 20 (or final substrate), of a metal master in which said structure is formed using the method described above. The imprinted structure 23 comprises the first pattern 22, the shape of which was possibly defined using the described method. The first pattern 22 is a bas-relief the facets 24 of which replicate the shape of elementary areas 14 resulting from gridding the object. The first pattern is modulated by the second pattern. The second pattern forms a periodic grating 26 superposed on the first pattern, as has been described above. In one embodiment, a component according to the invention may comprise a plurality of structures imprinted at various locations on the substrate and formed using the method described above. Advantageously, the minimum separation between more than 90% of the pairs of adjacent ridges of the first pattern is at least two times larger than the pitch of the second pattern.

FIG. 8B is an enlargement of a portion of the imprinted structure 23. The diffractive elements of the second pattern 26 are superposed on the facet 24 of the first pattern 22. The imprinted structure 23 is covered with the thin layer 60 of material having a high index $n_1$, typically of about 2.2, for example zinc sulfide (ZnS). The thin layer 60 may be deposited using a vacuum deposition process. The imprinted structure 23 covered with the thin layer 60 is finally coated with the layer 50 of material having an index $n_2$ similar to the index of the material forming the substrate 20. The component thus obtained behaves as a color diffractive subtractive filter while recreating the optical depth effect of an object. Such a component is more easily recognized and memorized by an observer. In addition, the light reflected by the optical component is linearly polarized. This makes it very easy to check authenticity using linearly polarizing filters. Furthermore, superposing the facets of the first pattern and the diffractive elements of the second pattern makes it easier to see the second pattern under a point of light.

Figure 9:
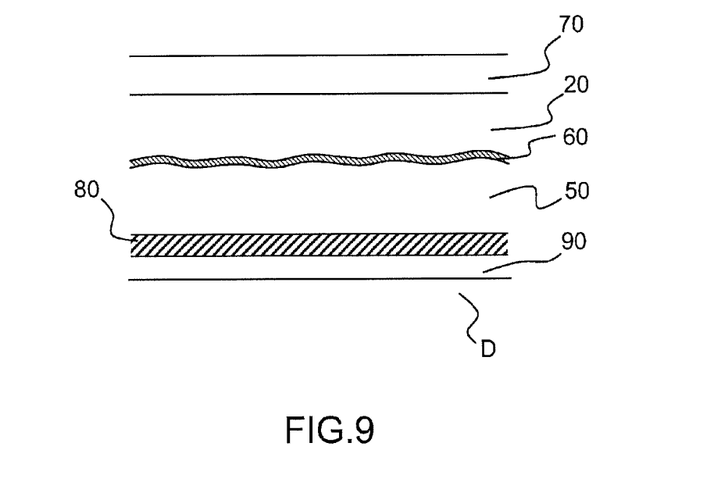
FIG. 9 illustrates an optical authentication component according to one embodiment of the invention, attached to a document.

FIG. 9 illustrates an optical component according to the invention in addition comprising a polymer layer 70 deposited on the substrate 20, an opaque layer 80 deposited on the encapsulating layer 50, and an adhesive layer 90 deposited on the opaque layer, for adhesive bonding to the surface of a document D. The opaque layer 80 enhances contrast effects and may be omitted. The adhesive layer 90 makes it possible to adhesively bond the component to the document D, and the polymer layer allows the component to be handled with ease. The polymer may, for example, be polyethylene terephthalate (PET), and may be detached after the component has been attached to the document D.

Figure 10A:
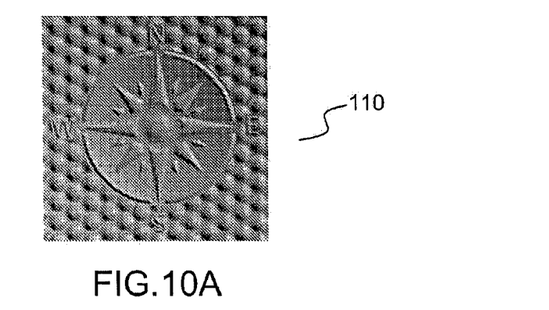
FIGS. 10A to 10C respectively illustrate, for one embodiment, a top view of a component according to the invention (FIG. 10A) and two atomic force micrographs (FIGS. 10B, 10C) of the structure of said component at two different resolutions, respectively.
Figure 10B:
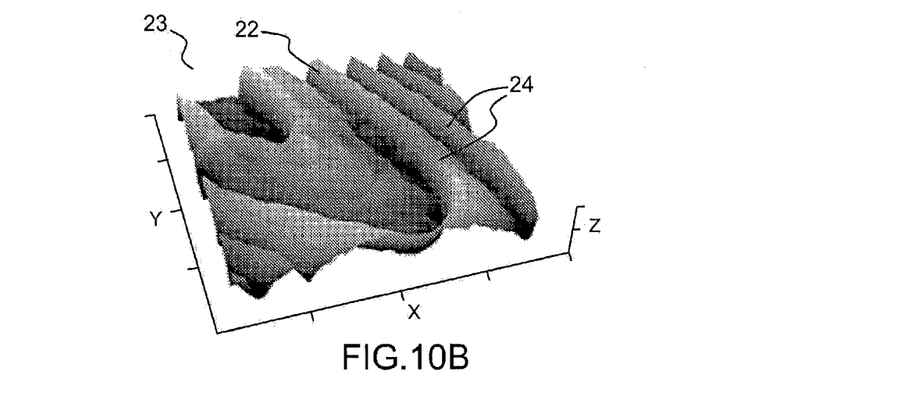
Figure 10C:
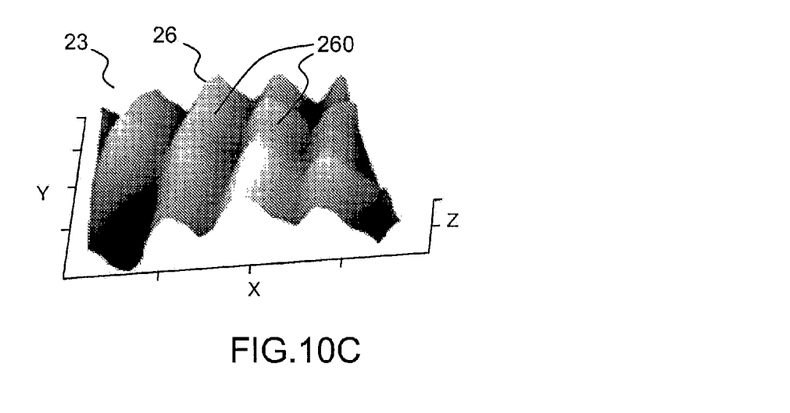

FIGS. 10A to 10C respectively illustrate, for one embodiment, a view of a component 110 according to the invention (FIG. 10A), and two atomic force microscope (AFM) micrographs (FIGS. 10B, 10C) of a partial view of the structure 23 forming said component, at two different microscope magnifications, respectively. The structure 23 comprises a first pattern 22 (bas-relief) modulated by a second pattern 26 (periodic grating). The object the relief of which it is desired to simulate is, in this example, a compass rose. In this example, the bas-relief 22 of the structure 23, which may be seen in FIG. 10B, comprises an array of facets the shapes of which have been calculated in order to simulate the relief of the object formed by the compass rose. In this example, it may be seen in FIG. 10B that the facets were obtained using planar slices (as was described, for example, with regard to FIGS. 6A, 6B), because the pitch between the facets varies. Specifically, FIG. 10B shows the part of the bas-relief simulating one of the tips of the compass rose over an area of about 60 μm×60 μm. The first pattern 22 is modulated by the second pattern 26, which is formed by diffractive elements 260 arranged periodically, as may be seen in FIG. 10C, which is at a higher magnification. Specifically, FIG. 10C shows an image of part of the structure shown in FIG. 10B, but enlarged so that the lines forming the diffraction grating may be seen. Typically, FIG. 10C thus shows part of the structure having an area of about 1.5 μm×1.5 μm. This exemplary embodiment thus illustrates the regular structure of the second pattern and, in contrast, the irregular structure of the bas-relief (first pattern) calculated to simulate the image in relief of an object in relief.

FIG. 10 shows a simulated view of the component produced after encapsulation of the structure 23, as described above. In this figure, the color effects resulting from the second pattern and normally visible, cannot be seen; in contrast the relief effect resulting from the first pattern of the structure is shown.

The optical component according to the invention obtained in this way is a component that can be seen in reflection and that provides a very high level of security. Specifically, it is easy to check visually while being extremely difficult to falsify due to the technical nature of the manufacturing method employed.

Moreover, the method for manufacturing such an optical component is compatible with other standard optical effects used in security components.

Although described using a number of embodiments, the optical component and the manufacturing method according to the invention comprise a number of variants, modifications and improvements that will appear obvious to those skilled in the art, it being understood that these various variants, modifications and improvements are part of the scope of the invention such as defined by the following claims.

The invention claimed is:

1. An optical authentication component visible in reflection, comprising:
    at least one structure imprinted on a substrate of refractive index $n_0$;
    a thin layer having a thickness between 50 and 150 nanometers, made of a dielectric material having a refractive index $n_1$ different from $n_0$, deposited on said at least one structure; and
    a layer, made of a material having a refractive index $n_2$, encapsulating the at least one structure coated with the thin layer, wherein $n_2$ is approximately the same as $n_0$,
    wherein the at least one structure comprises a first pattern and a second pattern that modulates the first pattern:
    the first pattern being a bas-relief comprising an array of facets the shapes of which are defined in order to simulate an image in relief of an object in relief;
    the second pattern being a periodic grating that modulates the first pattern in order to produce, after the thin layer has been deposited and said at least one structure has been encapsulated, a first color at a first viewing angle and a different second color at a second viewing angle obtained by azimuthal rotation of the optical authentication component.

2. The optical component as claimed in claim 1, wherein said first pattern forms a recognizable graphic when the component is observed in order to check authenticity.

3. The optical component as claimed in claim 1, wherein the refractive index difference $\Delta n$ between the refractive indices $n_1$ and $n_0$ is greater than about 0.5.

4. The optical component as claimed claim 1, wherein the dielectric material of refractive index $n_1$ comprises at least one material from the group consisting of: zinc sulfide and titanium dioxide.

5. The optical component as claimed in claim 1, wherein a depth of the first pattern is between 0.5 and 7 microns and a depth of the second pattern is between 50 and 300 nanometers.

6. The optical component as claimed in claim 1, wherein the second pattern has a pitch of between 200 and 500 nanometers.

7. The optical component as claimed in claim 6, wherein the facets of the first pattern have crests forming an alternation of ridges, a separation between more than 90% of the pairs of adjacent ridges of the first pattern being at least two times larger than the pitch of the second pattern.

8. The optical component as claimed in claim 1, wherein the second pattern is a one-dimensional periodic grating.

9. The optical component as claimed in claim 1, wherein the second pattern is a two-dimensional periodic grating.

10. The optical component as claimed in claim 1, wherein the substrate and the dielectric material forming the thin layer are transparent.

11. The optical component as claimed in claim 1, further comprising:
    a polymer layer deposited on the substrate;
    an opaque layer deposited on the layer encapsulating the at least one structure; and
    an adhesive layer deposited on the opaque layer, for adhesive bonding to the surface of a document.

12. The optical component as claimed in claim 1, wherein facets of the first pattern have a shape which is approximated by areas comprising two or more levels.

\* \* \* \* \*